United States Patent [19]
DeCurtis et al.

[11] Patent Number: 6,036,011
[45] Date of Patent: Mar. 14, 2000

[54] LAP TOP COMPUTER CARRYING CASE CONSTRUCTION

[76] Inventors: Paul DeCurtis; Kelly DeCurtis, both of 838 W. King Rd., Malvern, Pa. 19355

[21] Appl. No.: 09/264,017

[22] Filed: Mar. 8, 1999

[51] Int. Cl.[7] .............................. B65N 85/00; A47B 3/10
[52] U.S. Cl. ......................... 206/320; 190/11; 190/18 R; 206/576
[58] Field of Search ..................... 206/320, 305, 206/373, 576; 190/11, 18 R, 102, 900, 901, 902; 108/43

[56] References Cited

U.S. PATENT DOCUMENTS

| | | | |
|---|---|---|---|
| D. 170,728 | 10/1953 | Tavolazzi | 206/373 X |
| 873,855 | 12/1907 | Goldin | 190/11 |
| 2,609,072 | 9/1952 | Levinson | 190/11 |
| 3,983,976 | 10/1976 | Taylor | 190/18 R |
| 4,034,518 | 7/1977 | Trecker | 190/11 X |
| 4,049,091 | 9/1977 | Chubb . | |
| 4,856,677 | 8/1989 | Polator | 190/11 |
| 4,986,395 | 1/1991 | Lewis | 190/11 X |
| 5,379,893 | 1/1995 | Ruiz | 206/320 |
| 5,445,266 | 8/1995 | Prete et al. . | |
| 5,598,786 | 2/1997 | Patterson . | |
| 5,623,869 | 4/1997 | Moss et al. . | |
| 5,788,575 | 8/1998 | Fluster . | |

FOREIGN PATENT DOCUMENTS 695198   9/1930   France ...................................... 190/11

*Primary Examiner*—Bryon P. Gehman
*Attorney, Agent, or Firm*—Henderson & Sturm LLP

[57] ABSTRACT

A carrying case construction 10 for transporting a lap top computer 100 and associated mouse 101 to a point of use wherein the construction 10 is convertible into an elevated work station for the computer 100 and includes a carrying case unit including a carrying case member 20 dimensioned to receive the computer 100 and mouse 101 and having a lower base element 21 provided with four pivoted and telescoping support legs 30, and a shelf member 40 slidably received within the base element 21 wherein the shelf member 40 is dimensioned to receive the mouse 101 and is further provided with a high friction surface 42 that functions as a mouse pad.

7 Claims, 2 Drawing Sheets

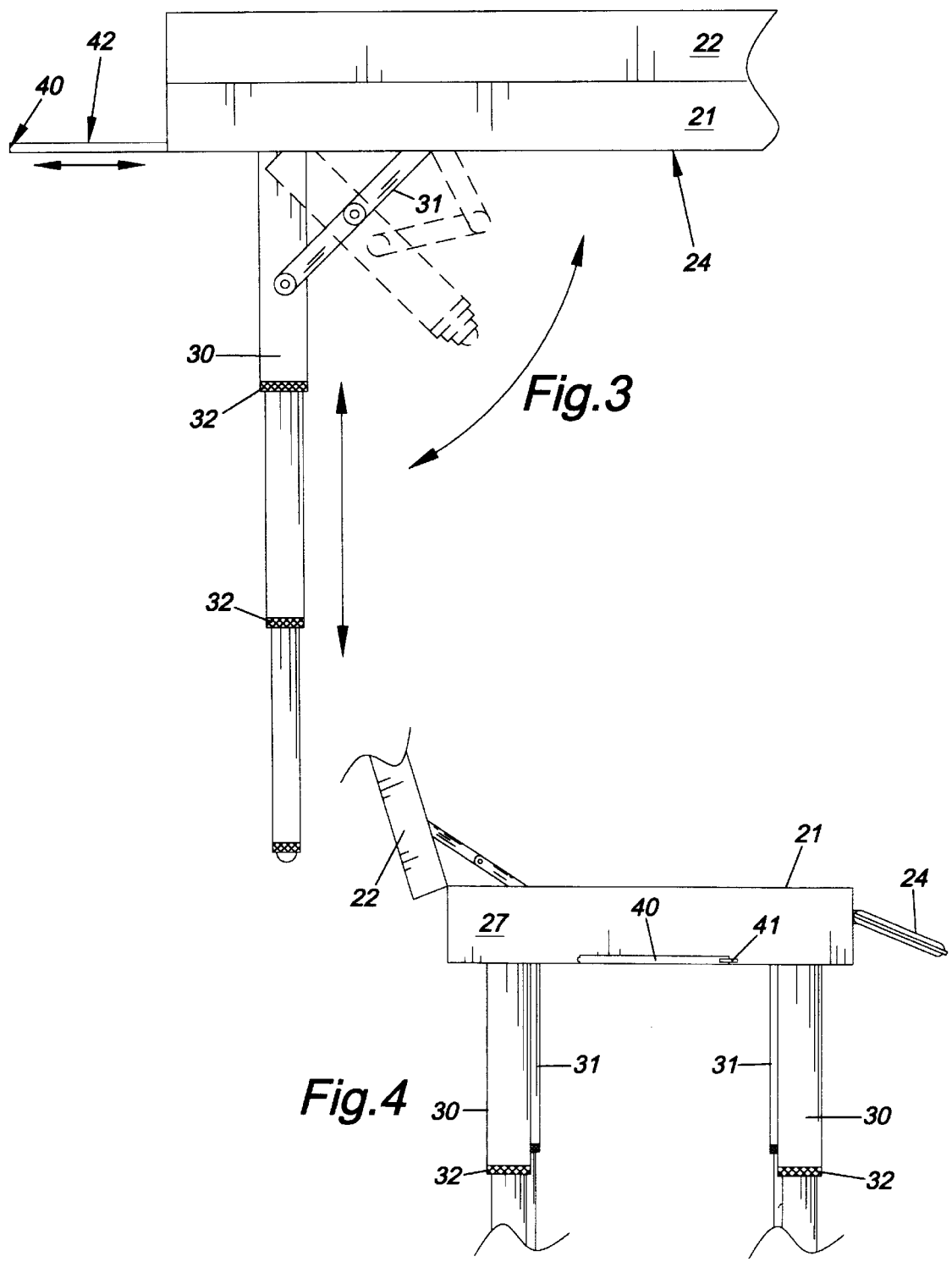

LAP TOP COMPUTER CARRYING CASE CONSTRUCTION

BACKGROUND OF THE INVENTION

1. Field of the Invention

The present invention relates to the field of portable work stations in general and, in particular, to a carrying case construction for a lap top computer that can be converted into a portable work station.

2. Description of Related Art

As can be seen by reference to the following U.S. Pat. Nos. 5,788,575; 5,598,786; 4,049,091; 5,623,869; and 5,445,266, the prior art is replete with myriad and diverse collapsible work stations and computer carrying cases.

While all of the aforementioned prior art constructions are more than adequate for the basic purpose and function for which they have been specifically designed, they are uniformly deficient with respect to their failure to provide a simple, efficient, and practical device for both transporting a lap top computer to a particular location and then converting the carrying case into a work station that is specifically designed to facilitate the operation of the lap top computer.

As most users of lap top computers who are required to travel extensively in their jobs are all too well aware, there does not presently exist a lap top carrying case that can quickly and easily be converted into a work station that is specifically designed to cooperate with a lap top computer.

As a consequence of the foregoing situation, there has existed a longstanding need for a new and improved type of lap top computer carrying case that addresses all of the deficiencies of the prior art constructions; and, the provisions of such a carrying case is the stated objective of the present invention.

BRIEF SUMMARY OF THE INVENTION

Briefly stated, the lap top computer carrying case construction that forms the basis of the present invention comprises, in general, a carrying case unit and an adjustable case support unit, and a retractable mouse support unit operatively associated with the carrying case unit.

As will be explained in greater detail further on in the specification, the carrying case unit is dimensioned to receive a conventional lap top computer and mouse and provided with a bottom surface having four elongated recesses dimensioned to partially receive the four telescoping support leg members that comprise the adjustable case support unit and which are further pivotally connected to the bottom surface of the carrying case unit for maintaining the carrying case unit at a desired height.

In addition, the bottom surface and one sidewall of the carrying case unit are provided with an elongated grooved aperture that is dimensioned to slidably receive the retractable mouse support unit which includes a suitably configured shelf member having a high friction upper surface that serves as a mouse pad; wherein the carrying case unit also includes a pivoted catch element for maintaining the shelf member in a retracted position relative to the carrying case unit.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein:

FIG. 3 is a partial side view of the carrying case unit; and, FIG. 4 is a partial end view of the carrying case unit.

DETAILED DESCRIPTION OF THE INVENTION

Figure 1:
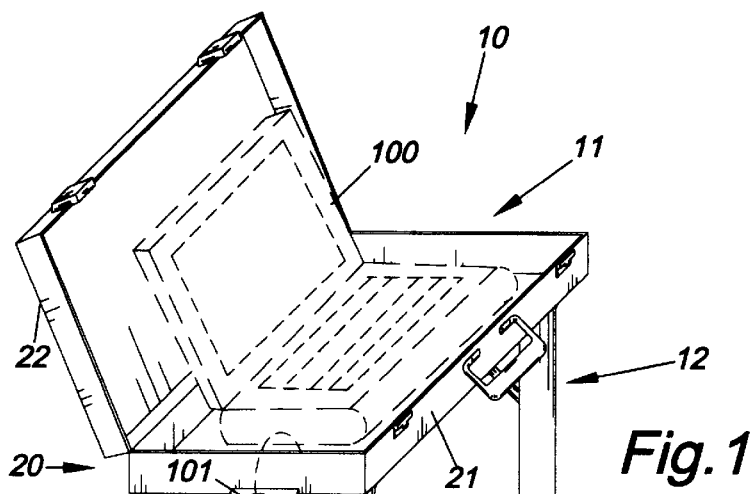
FIG. 1 is a perspective view of the carrying case construction in the open position with the support units in their fully extended mode.

As can be seen by reference to the drawings, and in particular to FIG. 1, the lap top computer carrying case construction that forms the basis of the present invention is designated generally by the reference number 10. The carrying case construction comprises, in general, a carrying case unit 11 an adjustable case support unit 12 and a retractable mouse support unit 13. These units will now be described in seriatim fashion.

Figure 2:
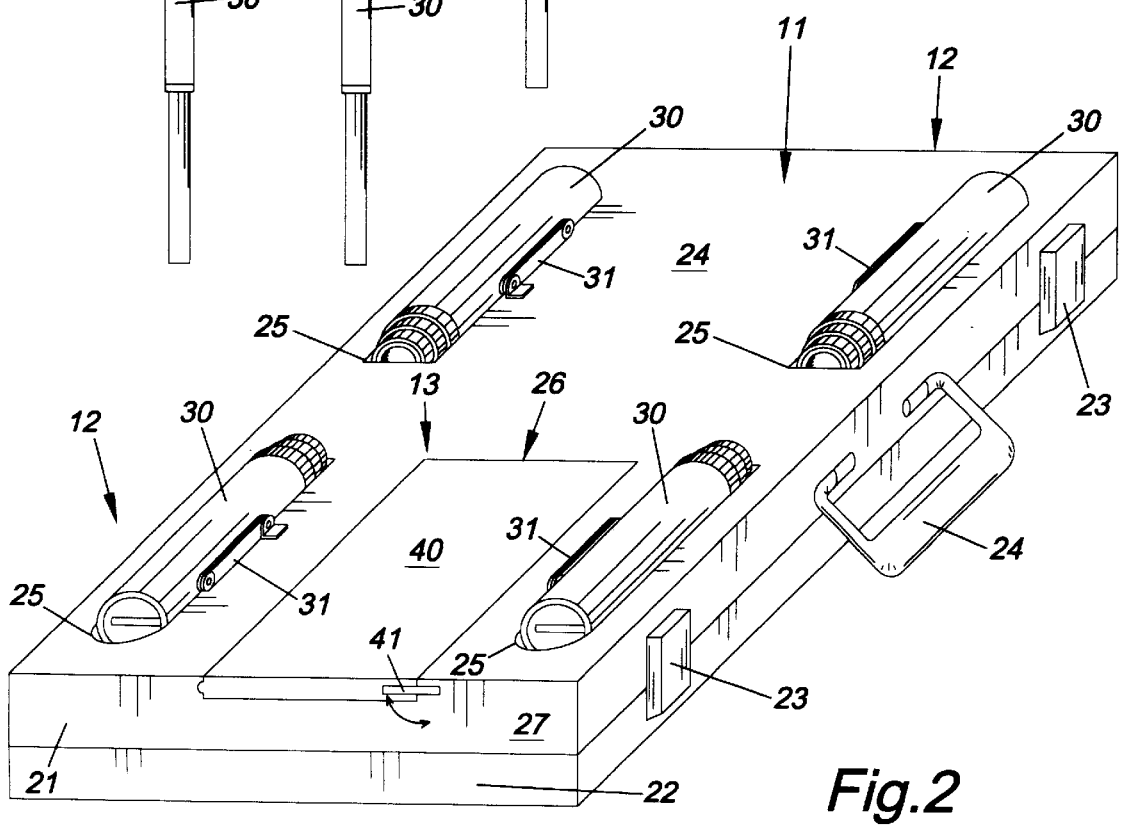
FIG. 2 is a construction perspective view of the bottom of the carrying case in the closed position with the support units in their fully retracted mode.

As shown in FIGS. 1 and 2, the carrying case unit 11 comprises a generally elongated, rectangular case member 20 having a lower base element 21 and an upper lid element 22 which are dimensioned to receive a conventional lap top computer 100 equipped with a mouse 101; wherein, the case member 20 is further provided with latches 23 for securing the lid element 22 to the base element 21 and a handle element 24 for transporting the case member 20 in the usual fashion.

As can be seen by reference to FIG. 2, the bottom surface 24 of the base element 21 is provided with four elongated recesses 25 which are disposed generally parallel to the elongated sides of the base element 21 and an enlarged grooved aperture 26 which intersects one of the side walls 27 of the base element 21 wherein the four elongated recesses 25 are generally aligned with the four corners of the bottom surface 24 of the base element 21.

Turning now to FIGS. 2 through 4, it can be seen that the four elongated recesses 25 in the bottom surface 24 of the base element 21 are dimensioned to partially receive the case support unit 12 wherein the case support unit 12 comprises four telescoping leg members 30 wherein each telescoping leg member 30 is pivotally secured to one end of a collapsible linkage element 31 wherein the other end of the collapsible linkage element 31 is further pivotally secured to the bottom surface 24 of the base element 21.

As can also be seen by reference to FIGS. 2 through 4, the retractable mouse support unit 13 comprises a generally rectangular shelf member 40 which is slidably received in the enlarged grooved aperture 26 which extends through one side 27 of the base element 21; wherein, the shelf member 40 is designed to be releasably received within the grooved aperture 26 by a pivoted catch element 41 that will retain the shelf member 40 within the base element 21 in the stored disposition.

In addition, as shown in FIG. 3, this invention also contemplates providing the top of the shelf member 40 with a friction surface 42 such that the shelf member 40 can function as a substitute mouse pad in a well recognized fashion.

Furthermore, as shown in FIGS. 3 and 4, each of the telescoping segments of the support leg member 30 are provided with conventional locking rings 32 such that the vertical height of each of the support leg members 30 can be varied to satisfy the user's preference.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

We claim:

1. A carrying case construction for transporting a lap top computer and associated mouse to a point of use wherein the carrying case is convertible into an elevated work station for the computer and the carrying case construction comprises;

a carrying case unit including a carrying case member having an upper lid element and a lower base element dimensioned to receive the lap top computer and mouse, an adjustable carrying case support unit including four support leg members which are pivotally and telescopically associated with the base element; wherein, the base element is provided with a bottom surface having four elongated recesses which are dimensioned to partially receive said four support leg members; and a retractable mouse support unit including a shelf member slidably associated with the base element wherein, the base element has a side wall provided with a grooved aperture that is dimensioned to slidably receive said shelf member wherein, the shelf member is provided with a high friction surface.

2. The construction, as in claim 1; wherein, said grooved aperture extends into the bottom surface of the base element.

3. The construction, as in claim 1; wherein, the base element is provided with means for captively engaging the shelf member in a retracted position relative to the base element.

4. The construction, as in claim 3; wherein, said means for captively engaging the shelf member in a retracted position relative to the base element comprises a catch element pivotally connected to said side wall.

5. A carrying case construction for transporting a lap top computer and associated mouse to a point of use wherein the carrying case is convertible into an elevated work station for the computer and the carrying case construction comprises;

a carrying case unit including a carrying case member having an upper lid element and a lower base element dimensioned to receive the lap top computer and mouse, an adjustable carrying case support unit including four support leg members which are pivotally and telescopically associated with the base element; and, a retractable mouse support unit including a shelf member slidably associated with the base element, and provided with a high friction surface wherein the base element has a side wall provided with a grooved aperture that is dimensioned to slidably receive said shelf member.

6. The construction, as in claim 5 wherein, the base element is provided with means for captively engaging the shelf member in a retracted position relative to the base element.

7. The construction as in claim 6; wherein, said means for captively engaging the shelf member in a retracted position relative to the base element comprises a catch element pivotally connected to said side wall.

* * * * *